United States Patent
Shiwaya et al.

(10) Patent No.: US 9,812,959 B2
(45) Date of Patent: Nov. 7, 2017

(54) STEP UP/DOWN SWITCHING REGULATOR

(71) Applicants: Yohichi Shiwaya, Osaka (JP); Shinya Shimizu, Hyogo (JP)

(72) Inventors: Yohichi Shiwaya, Osaka (JP); Shinya Shimizu, Hyogo (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 5 days.

(21) Appl. No.: 14/463,895

(22) Filed: Aug. 20, 2014

(65) Prior Publication Data
US 2015/0054479 A1 Feb. 26, 2015

(30) Foreign Application Priority Data
Aug. 23, 2013 (JP) ................................ 2013-173686

(51) Int. Cl.
*H02M 3/158* (2006.01)
*H02M 1/00* (2006.01)

(52) U.S. Cl.
CPC ......... *H02M 3/158* (2013.01); *H02M 3/1582* (2013.01); *H02M 2001/0032* (2013.01); *H02M 2001/0041* (2013.01); *Y02B 70/16* (2013.01)

(58) Field of Classification Search
CPC ................. H02M 3/158; H02M 3/155; H02M 2001/0038; H02M 2001/0041; H02M 2001/008; H02M 3/137; G05F 1/46; G05F 1/66; G05F 3/02
See application file for complete search history.

(56) References Cited

U.S. PATENT DOCUMENTS

| | | | | |
|---|---|---|---|---|
| 8,129,970 B2 * | 3/2012 | Nishida | ............... | H02M 3/1582 323/284 |
| 8,400,128 B1 * | 3/2013 | Kahn | .................... | H02M 3/156 323/282 |
| 8,810,214 B2 * | 8/2014 | Van Dijk | .............. | H02M 3/158 323/266 |
| 2006/0208717 A1 | 9/2006 | Shimizu et al. | | |
| 2007/0075697 A1 | 4/2007 | Shimizu et al. | | |
| 2007/0273341 A1 * | 11/2007 | Shimizu | ............. | H02M 3/1582 323/224 |
| 2008/0068869 A1 | 3/2008 | Shimizu | | |
| 2008/0079405 A1 | 4/2008 | Shimizu | | |

(Continued)

FOREIGN PATENT DOCUMENTS

| | | |
|---|---|---|
| JP | 5-038138 | 2/1993 |
| JP | 2007-189771 | 7/2007 |

(Continued)

*Primary Examiner* — Jessica Han
*Assistant Examiner* — Demetries A Gibson
(74) *Attorney, Agent, or Firm* — Cooper & Dunham LLP

(57) ABSTRACT

A step up/down switching regulator converts an input voltage of an input terminal into a predetermined setting voltage in a step up/down manner and outputs the setting voltage as an output voltage from an output terminal. The step up/down switching regulator includes a bypass mode in which the input voltage is directly bypassed to the output terminal without performing a step up/down switching, and a step up/down switching mode in which the step up/down switching is performed. The step up/down switching regulator includes a step up/down output unit, a step up/down control unit, and a mode select terminal.

6 Claims, 8 Drawing Sheets

(56) References Cited

U.S. PATENT DOCUMENTS

| | | | |
|---|---|---|---|
| 2008/0122419 A1 | 5/2008 | Shimizu et al. | |
| 2008/0169793 A1 | 7/2008 | Okuda et al. | |
| 2008/0278129 A1 | 11/2008 | Shimizu | |
| 2009/0115392 A1 | 5/2009 | Shimizu | |
| 2009/0261753 A1 | 10/2009 | Kishioka et al. | |
| 2009/0302820 A1 | 12/2009 | Shimizu et al. | |
| 2009/0322299 A1 | 12/2009 | Michishita et al. | |
| 2010/0066328 A1 | 3/2010 | Shimizu et al. | |
| 2010/0188065 A1 | 7/2010 | Shiwaya | |
| 2010/0277227 A1 | 11/2010 | Shiwaya | |
| 2011/0051296 A1* | 3/2011 | Ando | H03K 17/0822 361/18 |
| 2011/0133708 A1 | 6/2011 | Shiwaya | |
| 2011/0169464 A1 | 7/2011 | Michishita et al. | |
| 2012/0038341 A1 | 2/2012 | Michishita et al. | |
| 2014/0139197 A1* | 5/2014 | Price | G05F 1/46 323/280 |
| 2014/0265637 A1* | 9/2014 | Kaluzny | H02J 1/00 307/125 |

FOREIGN PATENT DOCUMENTS

| | | |
|---|---|---|
| JP | 2008-157837 | 7/2008 |
| JP | 2010-004658 | 1/2010 |
| JP | 2010-118918 | 5/2010 |
| JP | 2013-059186 | 3/2013 |
| WO | WO02/099947 A1 | 12/2002 |

\* cited by examiner

STEP UP/DOWN SWITCHING REGULATOR

CROSS-REFERENCE TO RELATED APPLICATIONS

This patent application is based on and claims priority pursuant to 35 U.S.C. §119(a) to Japanese Patent Application No. 2013-173686, filed on Aug. 23, 2013, in the Japan Patent Office, the entire disclosure of which is hereby incorporated by reference herein.

BACKGROUND

Technical Field

The present invention relates to a step up/down switching regulator, and more particular to a step up/down switching regulator which converts and outputs an input voltage into a predetermined output voltage.

Description of the Related Art

In recent years, electronic apparatuses mainly employ secondary batteries as rechargeable batteries. While power saving is always requested in the electronic apparatuses, a step up/down switching regulator which can supply power from the secondary batteries with high efficiency is widely used.

In the step up/down switching regulator consuming a relative large amount of current, a reduction in current consumption contributes to a reduction in current consumption of the electronic apparatuses in a standby mode. Thus, there has been employed a technology in which a short circuit is provided to short-circuit the input and the output of the step up/down switching regulator, and the input and the output of the step up/down switching regulator is short-circuited at the time of a light load to stop a switching operation so that the current consumption of the electronic apparatus itself is reduced.

However, the step up/down switching regulator has a large-sized output switch to regulate an input voltage compared to a step up type or a step down type, and the number of switches is also large. Therefore, when a short circuit is inserted in the step up/down switching regulator to make the input and the output thereof short-circuited, a chip occupies a large size depending on a magnitude of an impedance of the short circuit, so that the cost of the chip and a space for mounting the chip in the electronic apparatus are increased.

SUMMARY

According to embodiments of the invention, there is provided a step up/down switching regulator. The step up/down switching regulator includes: an input terminal configured to input an input voltage; an output terminal configured to output a predetermined setting voltage, which is converted from the input voltage; a step up/down output unit configured to include a step down switch connected between the input terminal and an input terminal of an inductor, a step down regulation switch connected between the input terminal of the inductor and a ground terminal, a step up switch connected between an output terminal of the inductor and the ground terminal, and a step up regulation switch connected between the output terminal of the inductor and the output terminal; a step up/down control unit configured to control step up/down switching; and a mode select terminal configured to receive a mode select signal to selectively set 1) a step up/down switching mode in which step up/down switching is performed and 2) a bypass mode in which the input voltage is directly bypassed to the output terminal without being subjected to step up/down switching. When the step up/down switching mode is set based on the mode select signal, the step up/down control unit performs step up/down switching to make the output voltage become the setting voltage so as to generate a control signal to turn on/off the step up/down output unit, and the step up/down output unit operates based on the control signal. When the bypass mode is set based on the mode select signal, the step up/down control unit generates a control signal to forcibly turn on the step down switch and the step up regulation switch so as to forcibly turn off the step down regulation switch and the step up switch which are connected to the ground terminal, so that the input voltage is bypassed out to the output terminal through the step down switch, the inductor, and the step up regulation switch from the input terminal.

DETAILED DESCRIPTION

Figure 1:
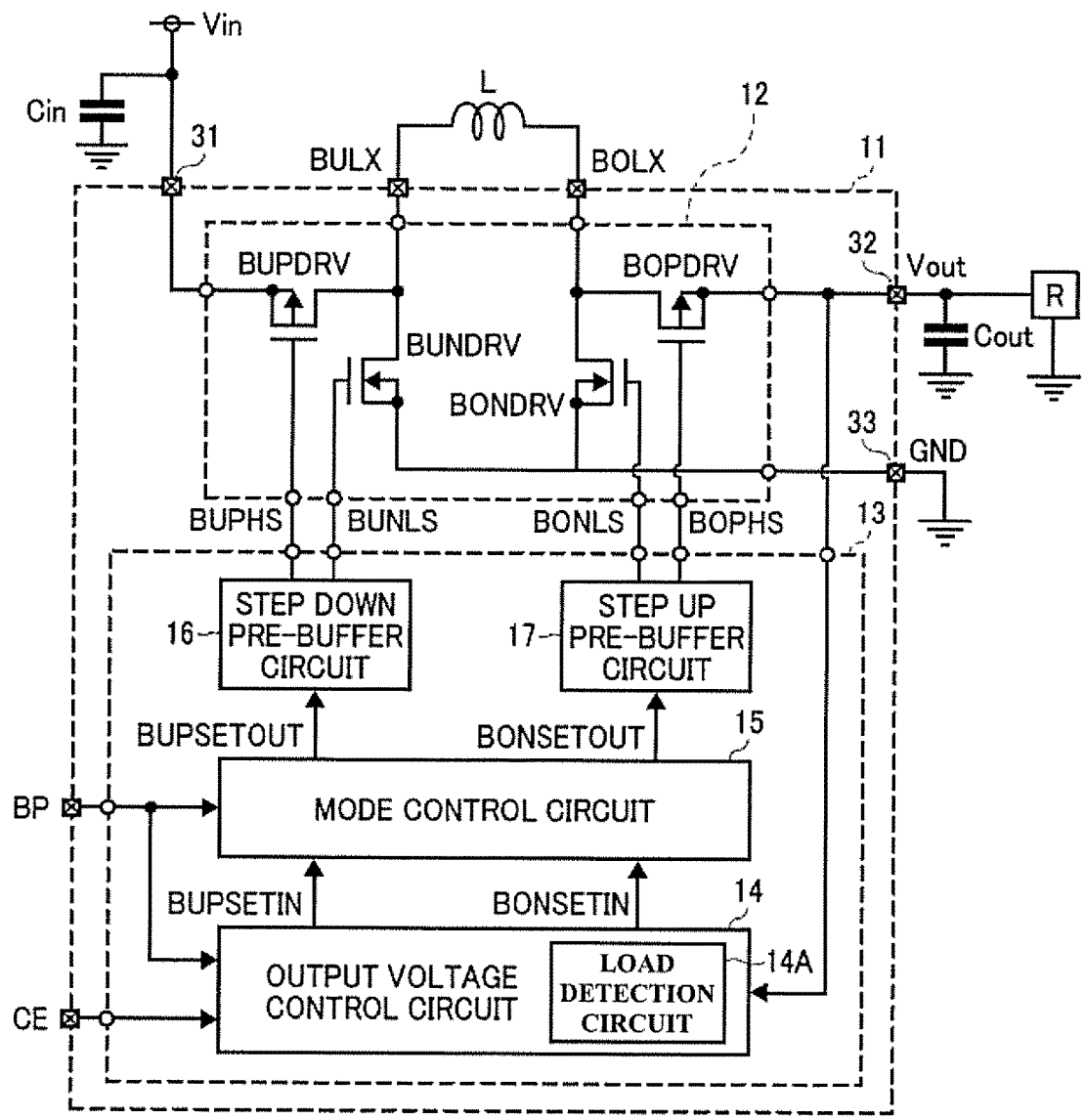
FIG. 1 is a block diagram illustrating an example of a configuration of a step up/down switching regulator according to a first embodiment of the invention.

Hereinafter, embodiments according to the invention will be described with reference to the drawings. In addition, the same components in the following embodiments will be denoted by the same reference numerals.

First Embodiment

FIG. 1 is a block diagram illustrating an example of a configuration of a step up/down switching regulator 11 according to a first embodiment of the invention.

In FIG. 1, the step up/down switching regulator 11 converts an input voltage Vin input to an input terminal 31 into a predetermined setting voltage in a step-up or step-down manner using an inductor L, an input smoothing capacitor Cin, and an output smoothing capacitor (output capacity) Cout. Then, the step up/down switching regulator 11 supplies an output voltage Vout to a load R from an output terminal 32. Herein, the step up/down switching regulator 11 includes a step up/down output unit 12, a step up/down control unit 13, a chip enable terminal CE, and a mode select terminal BP which receives a mode select signal input from an external circuit to select between a step up/down switching mode and a bypass mode. In other words, the step up/down switching regulator 11 of FIG. 1 has two operation modes: the step up/down switching mode in which a step up/down switching is performed; and the bypass mode in which the input voltage is bypassed through the inductor L.

The step up/down output unit 12 includes a step down switch BUPDRV which is connected between the input terminal 31 and an input terminal BULX of the inductor L, and a step down regulation switch BUNDRV which is connected between the input terminal BULX of the inductor L and a ground terminal 33. The step up/down output unit 12 further includes a step up switch BONDRV which is connected between an output terminal BOLX of the inductor L and the ground terminal 33, and a step up regulation switch BOPDRV which is connected between the output terminal BOLX of the inductor L and the output terminal 32. Herein, the step down switch BUPDRV and the step up regulation switch BOPDRV are configured by a P-channel MOS field effect transistor (hereinafter, a MOS field effect transistor will be referred to as a MOS transistor). The step down regulation switch BUNDRV and the step up switch BONDRV are configured by an N-channel MOS transistor.

The step up/down control unit 13 includes an output voltage control circuit 14 which controls the output voltage Vout so as to be a predetermined setting voltage, and a mode control circuit 15 which selects between the step up/down switching mode and the bypass mode. The step up/down control unit 13 includes a step down pre-buffer circuit 16 which generates a control signal BUPHS of the step down switch BUPDRV and a control signal BUNLS of the step down regulation switch BUNDRV. The step up/down control unit 13 further includes a step up pre-buffer circuit 17 which generates a control signal BONLS of the step up switch BONDRV and a control signal BOPHS of the step up regulation switch BOPDRV.

The output voltage control circuit 14 generates the following signals based on a chip enable signal input to the chip enable terminal CE, the mode select signal input to the mode select terminal BP, and the detected output voltage Vout. The output voltage control circuit 14 generates an output voltage control input signal BUPSETIN in a step down mode and an output voltage control input signal BONSETIN in a step up mode and outputs these signals to the mode control circuit 15. The mode control circuit 15 converts these signals into an output voltage control output signal BUPSETOUT in the step down mode and an output voltage control output signal BONSETOUT in the step up mode based on the mode select signal. The output voltage control output signal BUPSETOUT in the step down mode is output to the step down pre-buffer circuit 16, the output voltage control output signal BONSETOUT in the step up mode is output to the step up pre-buffer circuit 17. Therefore, the step down pre-buffer circuit 16 and the step up pre-buffer circuit 17 make control on the operation of the step up/down output unit 12.

Table 1 is a truth table showing the output voltage control output signal BUPSETOUT in the step down mode and ON/OFF settings of the respective switches of the step up/down output unit 12 in the step up/down switching regulator 11 of FIG. 1. Further, Table 2 is a truth table showing the output voltage control output signal BONSETOUT in the step up mode and the ON/OFF settings of the respective switches of the step up/down output unit 12 in the step up/down switching regulator 11 of FIG. 1. In the embodiment, H represents a high level, and L represents a low level.

TABLE 1

| BUPSETOUT | BUPHS | BUNLS | NOTE |
|---|---|---|---|
| H | L(ON) | L(OFF) | |
| L | H(OFF) | H(ON) | STAND-BY (CE = L) |

TABLE 2

| BONSETOUT | BOPHS | BONLS | NOTE |
|---|---|---|---|
| H | H(OFF) | H(ON) | STAND-BY (CE = L) |
| L | L(ON) | L(OFF) | |

In a standby mode (CE=L), control is performed such that the step down switch BUPDRV and the step up regulation switch BOPDRV enter the OFF state, the step down regulation switch BUNDRV and the step up switch BONDRV enter the ON state, and a path from the input terminal 31 to the output terminal 32 through the inductor L is disconnected.

Figure 2:
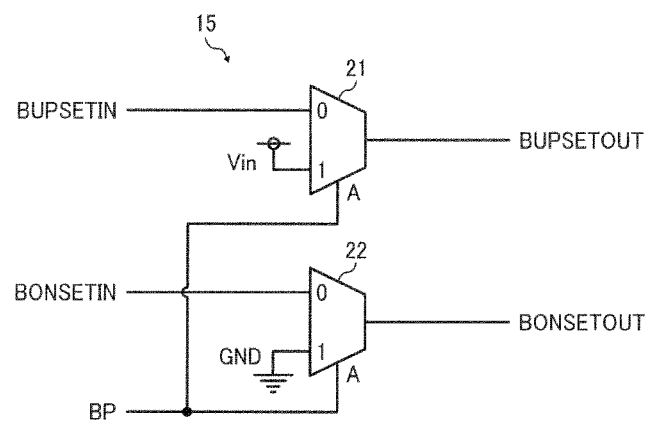
FIG. 2 is a circuit diagram illustrating an example of a specific configuration of a mode control circuit which is included in the step up/down switching regulator of FIG. 1.

FIG. 2 is a circuit diagram illustrating an example of a configuration of the mode control circuit 15 of FIG. 1. In FIG. 2, the mode control circuit 15 includes two selectors 21 and 22.

When the mode select terminal BP is at the L level (the step up/down switching mode), control signals BUPSETIN and BONSETIN generated by the output voltage control circuit 14 are output as control signals BUPSETOUT and BONSETOUT without any change. Therefore, step up/down control of the step up/down output unit 12 is performed.

When the mode select terminal BP is at the H level (the bypass mode), the step down switch BUPDRV and the step up regulation switch BOPDRV are forcibly turned on, and the control signals BUPSETOUT and BONSETOUT are generated to make the step down regulation switch BUNDRV and the step up switch BONDRV enter the OFF state. Therefore, control of a bypass output is performed such that a bypass route from the input terminal 31 to the output terminal 32 through the inductor L is opened.

Figure 3A:
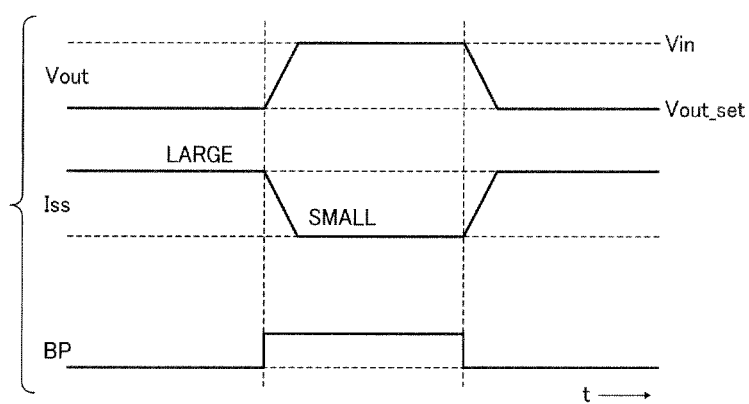
FIG. 3A is a timing chart illustrating a relation among a mode select signal input to a mode select terminal BP, an output voltage Vout, and a total current consumption of the step up/down switching regulator in the step up/down switching regulator of FIG. 1.

FIG. 3A is a timing chart illustrating a relation among the mode select signal input to the mode select terminal BP, the output voltage Vout, and total current consumption Iss of the step up/down switching regulator in the step up/down switching regulator 11 of FIG. 1.

When the mode select signal input to the mode select terminal BP is input also to the output voltage control circuit 14 and the bypass mode (BP=H) is selected, for example, a plurality of circuits for controlling the output voltage Vout in the output voltage control circuit 14 to be a setting voltage Vset are tuned off. Further, as illustrated in FIG. 3A, the total current consumption Iss of the step up/down switching regulator 11 is reduced only by turning off any one or all of the respective protective functions of a thermal shutdown circuit, a low voltage malfunction prevention circuit (hereinafter, referred to as a UVLO circuit), an output short-circuit detection circuit, and a current limit circuit (which is a circuit serving to detect an abnormal state of a signal or temperature of the step up/down switching regulator for protection).

Further, the output voltage control circuit 14 includes a load detection circuit 14A which detects a magnitude of the load current flowing in the output terminal 32 and operates by current consumption less than the total current consumption of the thermal shutdown circuit, the UVLO circuit, and the output short-circuit detection circuit. With this configuration, the current consumption of the step up/down switching regulator 11 in the bypass mode can be further suppressed.

Figure 3B:
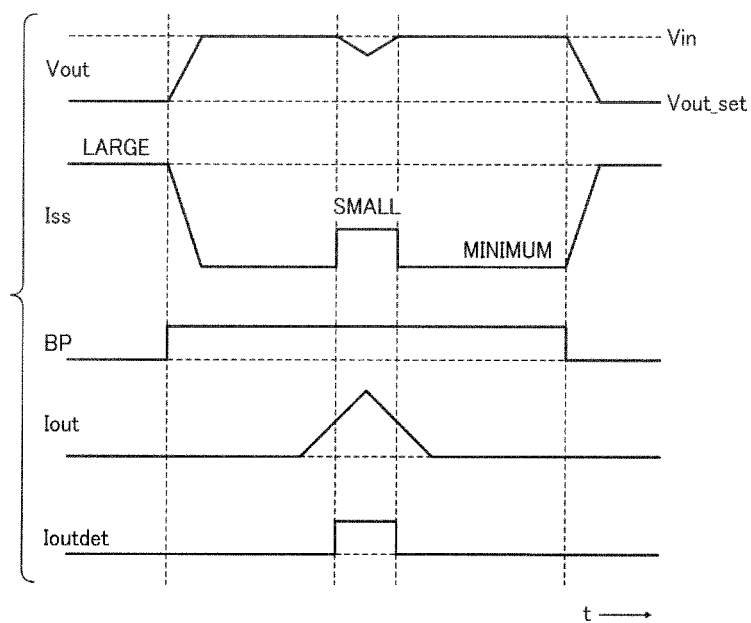
FIG. 3B is a timing chart illustrating a relation among the mode select signal input to the mode select terminal BP, the output voltage Vout, the total current consumption Iss of the step up/down switching regulator, a detection signal Ioutdet of a load detection circuit in the step up/down switching regulator of FIG. 1.

FIG. 3B is a timing chart illustrating a relation among the mode select signal input to the mode select terminal BP, the output voltage Vout, the total current consumption Iss of the step up/down switching regulator, and the detection signal Ioutdet of the load detection circuit 14A.

As illustrated in FIG. 3B, when the bypass mode BP=H is selected, only the load detection circuit 14A operates until the load detection circuit 14A is detected, so that an extremely low consumption is realized. Further, when the load detection circuit 14A detects a load current flowing of a given magnitude, the following control is performed. In other words, the thermal shutdown circuit, the UVLO circuit, and the output short-circuit detection circuit are turned on to activate the respective protective functions.

Second Embodiment

Figure 4:
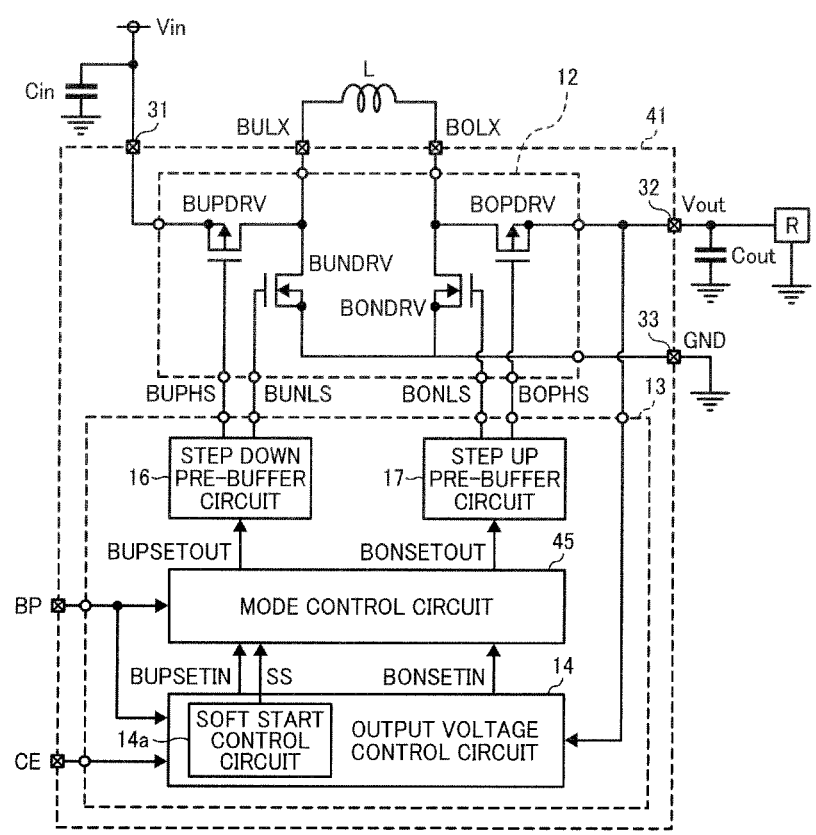
FIG. 4 is a block diagram illustrating a step up/down switching regulator according to a second embodiment of the invention in a case where a switching to a bypass mode is invalidated during a startup period of the step up/down switching regulator.

FIG. 4 is a block diagram illustrating an example of a configuration of a step up/down switching regulator 41 according to a second embodiment of the invention in a case where a switching to the bypass mode is invalidated during the startup period of the step up/down switching regulator. The step up/down switching regulator 41 according to the second embodiment is different from the step up/down switching regulator 11 of FIG. 1, for example, in the following points. (1) The output voltage control circuit 14 further includes a soft start control circuit 14a which generates a soft start signal SS indicating an end time point of a soft start of the step up/down switching regulator 41. Hereinafter, the difference will be described.

In FIG. 4, the soft start control circuit 14a outputs the soft start signal SS, which is changed from the "L" level to the "H" level when the soft start of the step up/down switching regulator is ended, to a mode control circuit 45.

Figure 5:
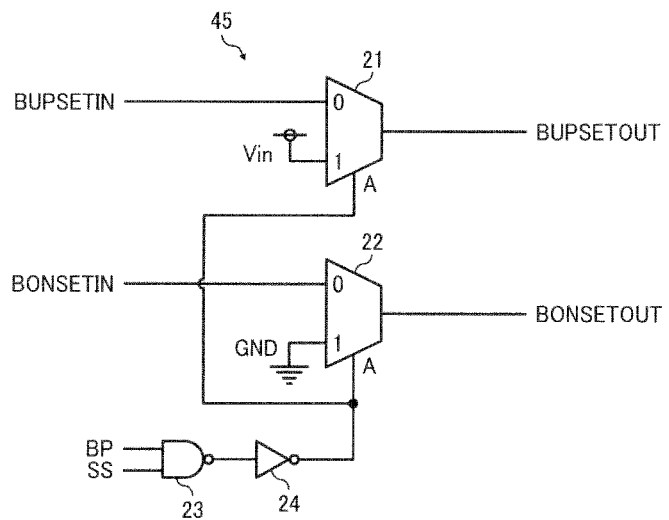
FIG. 5 is a circuit diagram illustrating an example of a specific configuration of a mode control circuit which is included in the step up/down switching regulator of FIG. 4.

FIG. 5 is a circuit diagram illustrating an example of a specific configuration of the mode control circuit 45 included in the step up/down switching regulator of FIG. 4. In FIG. 5, the mode control circuit 45 includes a NAND gate 23 which receives a mode select signal BP and the soft start signal SS as inputs, an inverter 24 which inverts its own output, and the selectors 21 and 22 which select a control signal based on the output signal from the inverter 24. During the startup period of a step up/down switching regulator 41, the soft start signal SS to invalidate the switching to the bypass mode is input to the mode control circuit 45. Herein, the bypass mode is an operation mode in which a control signal BUPSETIN is output as a control signal BUPSETOUT without any change and a control signal BONSETIN is output as a control signal BONSETOUT without any change. In the invalidation of the switching, the control signal BUPSETOUT becoming an input voltage Vin and the control signal BONSETOUT at the L level are output. Herein, during the startup period of the step up/down switching regulator 41, the soft start signal SS is at the L level, the step up/down switching mode is set for the control regardless of a setting state of the mode select signal input to a mode select terminal BP. After the soft start is ended and the startup is completed, the mode of the step up/down switching regulator 41 is selected according to the setting state of the mode select signal.

Figure 6:
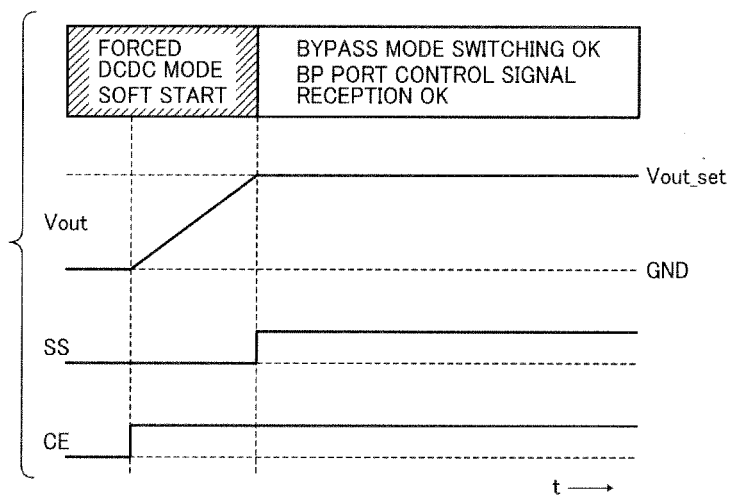
FIG. 6 is a timing chart illustrating a relation between the mode select signal input to the mode select terminal BP and the output voltage Vout in a case where the switching to the bypass mode is invalidated during the startup period of the step up/down switching regulator in the step up/down switching regulator of FIG. 4.

FIG. 6 is a timing chart illustrating a relation between the mode select signal input to the mode select terminal BP and an output voltage Vout in a case where the switching to the bypass mode is invalidated during the startup period of the step up/down switching regulator in the step up/down switching regulator of FIG. 4. In FIG. 6, Vout_set represents a setting voltage of the output voltage Vout.

As described above, according to the embodiment, the output voltage Vout is gradually increased as illustrated in FIG. 6 by using the soft start signal SS, so that it is also possible to suppress an inrush current during the startup period of the step up/down switching regulator 41.

Herein, an example of suppressing the inrush current during the startup period by using a soft start function of the step up/down switching regulator 41 is described. The invention is not limited to the above configuration, and the inrush current during the startup period may be suppressed by adjusting a slew rate from ON to OFF of a step down switch BUPDRV or a step up regulation switch BOPDRV as the startup in the bypass mode.

Third Embodiment

Figure 7:
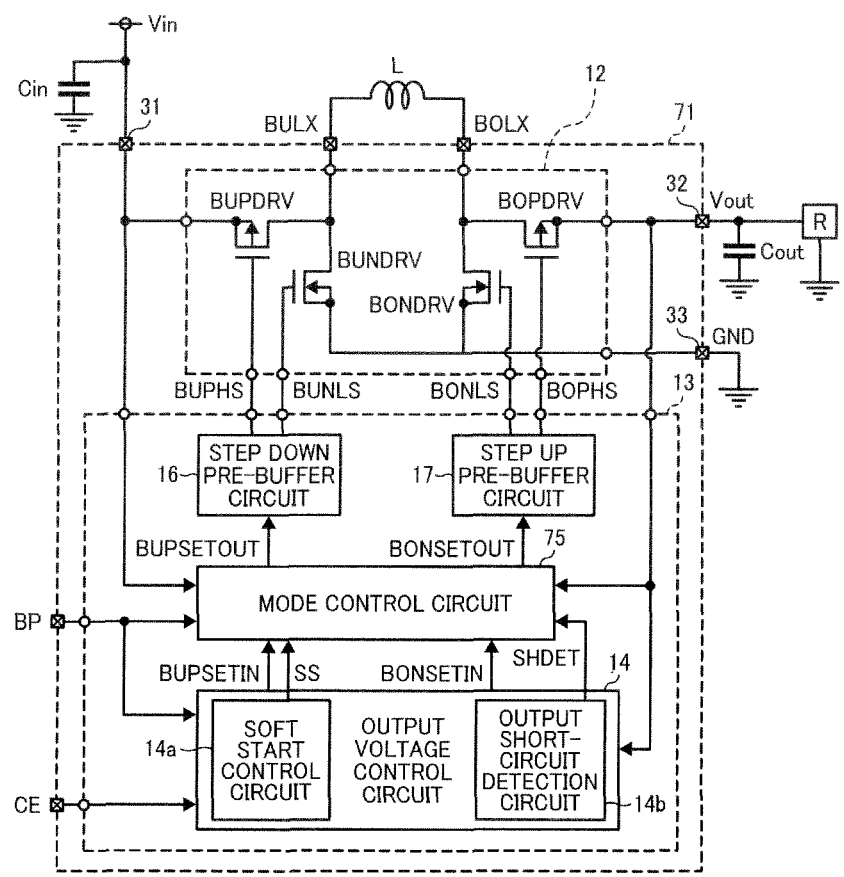
FIG. 7 is a block diagram illustrating a step up/down switching regulator according to a third embodiment of the invention in which a protection circuit is built in to prevent a large short current from flowing when an output terminal in the bypass mode is short-circuited.

FIG. 7 is a block diagram illustrating a step up/down switching regulator 71 according to a third embodiment of the invention in which a protection circuit is built in to prevent a large short current from flowing when an output terminal in the bypass mode is short-circuited. The step up/down switching regulator 71 of the third embodiment is different from the step up/down switching regulator 41 of FIG. 4 in the following points. (1) The output voltage control circuit 14 further includes an output short-circuit detection circuit 14b which generates an output short-circuit detection signal SHDET to be output to a mode control circuit 75. The output short-circuit detection signal is at the "H" level when it is detected that the output voltage Vout is short-circuited, or outputs the "L" level when the short circuit is released. (2) The mode control circuit 75 of FIG. 8 is included instead of the mode control circuit 45.

Figure 8:
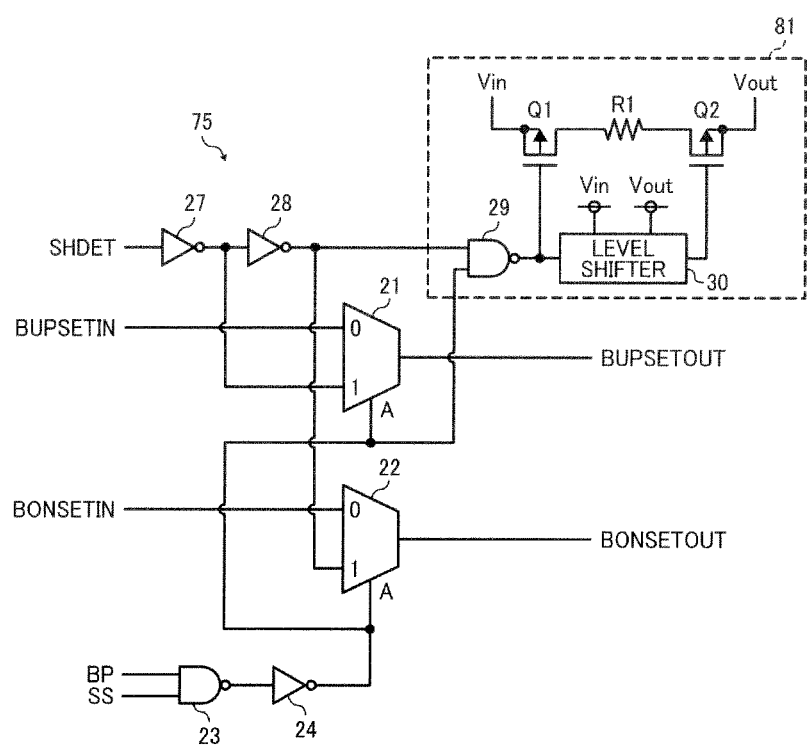
FIG. 8 is a circuit diagram illustrating an example of a specific configuration of a mode control circuit which is included in the step up/down switching regulator of FIG. 7.

FIG. 8 is a circuit diagram illustrating an example of a specific configuration of the mode control circuit 75 which is included in the step up/down switching regulator 71 of FIG. 7. In addition to the configuration of the mode control circuit 45 of FIG. 5, the mode control circuit 75 includes inverters 27 and 28 receiving the output short-circuit detection signal SHDET as an input, and a charging circuit 81 which charges an output smoothing capacitor Cout connected to an output terminal 32 to make the output terminal 32 restored after a factor causing a short circuit is released. Herein, the charging circuit Si includes a NAND gate 29, a level shifter 30, MOS transistors Q1 and Q2, and a resistor R1. In addition, the level shifter 30 is provided to raise a gate voltage of a MOS transistor Q1 from the level of the input voltage Vin to the level of the output voltage Vout and to apply the raised voltage to a gate voltage of a MOS transistor Q2. Further, a charging current value can be adjusted according to a resistance value of the resistor R1.

In FIG. 7, when the output terminal 32 is short-circuited to make the output short-circuit detection signal SHDET=L, a step down switch BUPDRV and a step up regulation switch BOPDRV enter the OFF state, and a step down regulation switch BUNDRV and a step up switch BONDRV enter the ON state. Then, a control is made to block the path from an input terminal 31 to the output terminal 32 through an inductor L. Further, during a period when the output short circuit is detected in the bypass mode (the output short-circuit detection signal SHDET=H), the charging circuit 81 turns on the MOS transistors Q1 and Q2 to form a path to allow a charging current to flow from the input terminal 31 to the output terminal 32. Herein, in order to prevent the entire chip size of the step up/down switching regulator 71 from being increased too much, and to prevent a large short current from continuously flowing, the sizes of the MOS transistors Q1 and Q2 and the resistor R1 forming the charging circuit 81 are adjusted.

In the embodiment, the operation of the charging circuit 81 during output short circuit in the bypass mode has been described as an example. The invention is not limited to the above configuration, and the path from the input terminal 31 to the output terminal 32 may be formed even when the output is not short-circuited in the bypass mode (that is, SHDET=L).

Modified Example

Figure 9:
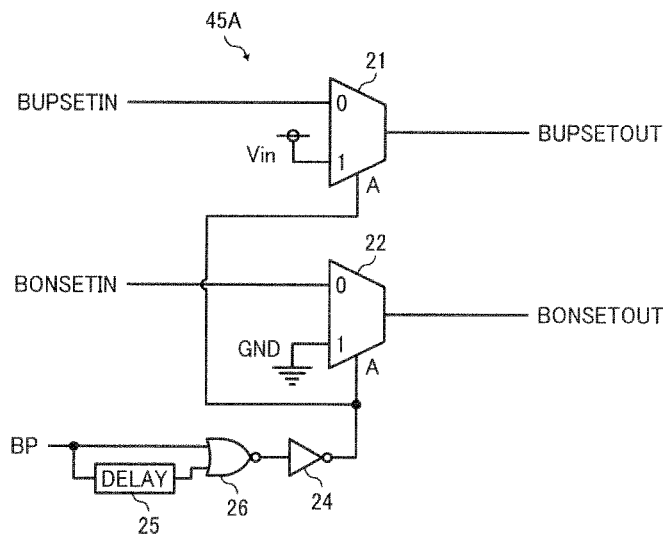
FIG. 9 is a circuit diagram illustrating a configuration of a mode control circuit according to a modification in which the bypass mode is maintained during a certain period of time with respect to the mode control circuit illustrated in FIG. 2 when a mode is changed from the bypass mode to a step up/down switching mode.

FIG. 9 is a circuit diagram illustrating a configuration of a mode control circuit 45A according to a modified example in which the bypass mode is maintained during a certain period of time with respect to the mode control circuit illustrated in FIG. 2 when a switching is made from the bypass mode to a step up/down switching mode. The mode control circuit 45A of FIG. 9 is different from the mode control circuit 45 of FIG. 5 in the following points.

(1) A NOR gate 26 is provided instead of the NAND gate 23.

(2) A delay circuit 25 is inserted to the input terminal at one end of the NOR gate 26.

When a mode is changed from the bypass mode to the step up/down switching mode, there is a concern that a wrong step up/down control signal is input to the step up/down control unit 13 until the output voltage control circuit 14 reaches the respective operation points in the step up/down switching mode. As a result of the control signal, the charges of the output smoothing capacitor Cout is discharged by the step down regulation switch BUNDRV or the step up switch BONDRV connected to a ground terminal 33 depending on a combination of ON/OFF of the respective switches of the step up/down output unit 12, and thus the output voltage Vout is distorted.

In the mode control circuit 45A illustrated in FIG. 9, the respective control signals BUPHS, BUNLS, BONLS, and BOPHS of the respective switches BUPDRV, BUNDRV, BONDRV, and BOPDRV of the step up/down output unit 12 are set to keep the bypass mode during a certain period of time by the delay circuit 25. Meanwhile, the output voltage control circuit 14 is restored at the respective operation points in the step up/down switching mode. Then, after a delay time determined by the delay circuit 25, the respective control signals BUPHS, BUNLS, BONLS, and BOPHS of the respective switches BUPDRV, BUNDRV, BONDRV, and BOPDRV of the step up/down output unit 12 are changed to the control signals in the step up/down switching mode.

Figure 10:
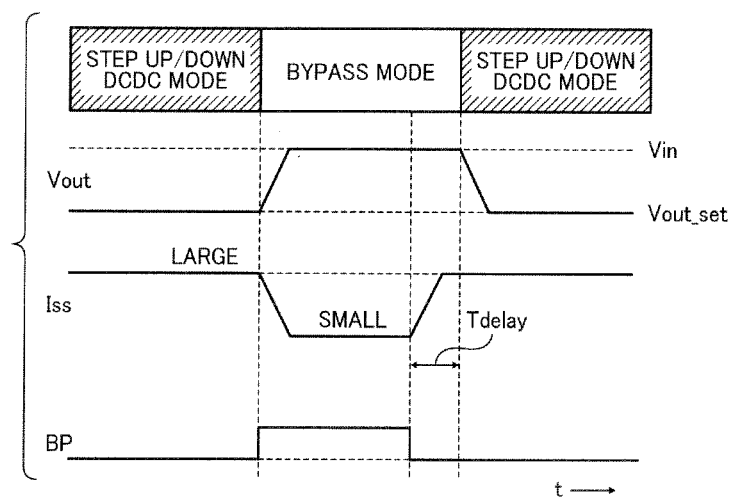
FIG. 10 is a timing chart illustrating a relation among the mode select signal input to the mode select terminal BP, the output voltage Vout, the total current consumption Iss of the step up/down switching regulator, and a delay control signal generated by the mode control circuit according to the modification illustrated in FIG. 9.

FIG. 10 is a timing chart illustrating a relation among the mode select signal input to the mode select terminal BP, the output voltage Vout, the total current consumption Iss of the step up/down switching regulator, and a delay control signal generated by the mode control circuit according to the modification illustrated in FIG. 9. By making control as described in the modified example, when a switching is changed from the bypass mode to the step up/down switching mode, the distortion of the output voltage caused by the output switch of the step up/down switching regulator 41 itself can be suppressed.

In FIG. 10, Tdelay is a time period for waiting restoring operation point for the output voltage control circuit 14, and that the bypass mode is maintained.

As described above, according to the embodiments of the invention, the configuration can be made only by the output switch which outputs the step up/down output voltage of the step up/down switching regulator without any dedicated additional circuit for the input/output short circuit which impacts on the chip size. Further, it is possible to provide a step up/down switching regulator which can reduce its own current consumption by stopping the switching through the input/output short circuit. Therefore, the configuration can contribute to a reduction in current consumption during the standby of the electronic apparatus.

Further, according to the embodiments of the invention, it is possible to suppress the inrush current during the startup period using the soft start function of the step up/down switching regulator. In addition, it is possible to perform the protection against the output short circuit in the bypass mode and the restoring operation from the short-circuit release. Thus, it is possible to provide the step up/down switching regulator which can reduce its own current consumption by stopping the switching through the input/output short circuit as well as the protective function of the electronic apparatus.

Hitherto, the description has been given as an example in which the respective embodiments of the invention are applied to the step up/down switching regulator. The invention is not limited to the above configuration, and can also be applied to a step down type of the step up/down switching regulator, a step up type of the step up/down switching regulator, and an asynchronous rectification type of the step up/down switching regulator to which a diode instead of a transistor is applied to a rectifying element.

What is claimed is:

1. A step up/down switching regulator comprising:
   an input terminal configured to input an input voltage;
   an output terminal configured to output a predetermined setting voltage, which is converted from the input voltage;
   a step up/down output unit configured to include
     a step down switch connected between the input terminal and an input terminal of an inductor, a step down regulation switch connected between the input terminal of the inductor and a ground terminal, a step up switch connected between an output terminal of the inductor and the ground terminal, and a step up regulation switch connected between the output terminal of the inductor and the output terminal;

a step up/down control unit configured to control step up/down switching; and a mode select terminal configured to receive a mode select signal to selectively set 1) a step up/down switching mode in which step up/down switching is performed and 2) a bypass mode in which the input voltage is directly bypassed to the output terminal without being subjected to step up/down switching, wherein (A) when the step up/down switching mode is set based on the mode select signal, the step up/down control unit performs step up/down switching to make the output voltage become the setting voltage so as to generate a control signal to turn on/off the step up/down output unit, and the step up/down output unit operates based on the control signal, and (B) when the bypass mode is set based on the mode select signal, the step up/down control unit generates a control signal to forcibly turn on the step down switch and the step up regulation switch so as to forcibly turn off the step down regulation switch and the step up switch which are connected to the ground terminal, so that the input voltage is bypassed out to the output terminal through the step down switch, the inductor, and the step up regulation switch from the input terminal, and wherein when the mode select signal changes the operation mode from the bypass mode to the step up/down switching mode, the step up/down control unit is further configured to:

keep each control signal of the step up/down output unit in the bypass mode during a predetermined period to operate the step up/down output unit in the bypass mode;

change the operation mode of a circuit to control the output voltage of the step up/down control unit to be the setting voltage into the step up/down switching mode so as to restore an operation point of the circuit; and change the operation mode of the each control signal of the step up/down output unit into the step up/down switching mode, to change the operation mode of the entire step up/down switching regulator into the step up/down switching mode.

2. The step up/down switching regulator according to claim 1, further comprising:

a circuit to control the output voltage of the step up/down control unit to be the setting voltage, wherein in the bypass mode, the step up/down control unit turns off the circuit to control the output voltage of the step up/down control unit, so as to turn on any one or all of circuits which detect an abnormal state of a signal or temperature of the step up/down switching regulator for protection.

3. The step up/down switching regulator according to claim 2, wherein the circuit to detect the abnormal state of the signal or temperature of the step up/down switching regulator for protection includes a thermal shutdown circuit, a low voltage malfunction prevention circuit, an output short-circuit detection circuit, and a current limit circuit.

4. The step up/down switching regulator according to claim 3, further comprising a load detection circuit that detects a magnitude of the load current flowing in the output terminal and operates by current consumption less than the total current consumption of the thermal shutdown circuit, the low voltage malfunction prevention circuit, and the output short-circuit detection circuit, wherein in the bypass mode, the step up/down control unit is configured to turn off the circuit to control the output voltage of the step up/down control unit, the thermal shutdown circuit, the low voltage malfunction prevention circuit, and the output short-circuit detection circuit, while keeping the load detection circuit turned on, and when the load detection circuit detects a flowing of a predetermined load current, the step up/down control unit turns on the thermal shutdown circuit, the low voltage malfunction prevention circuit, and the output short-circuit detection circuit.

5. The step up/down switching regulator according to claim 1, wherein during a startup period of the step up/down switching regulator, the step up/down control unit is activated by being forcibly set to the step up/down switching mode regardless of the mode select signal, and then is changed to a mode set by the mode select signal.

6. The step up/down switching regulator according to claim 1, further comprising:

a charging circuit configured, when the output terminal is short-circuited in the bypass mode and an output short-circuit detection circuit detects the short circuit, to turn off the step down switch and the step up regulation switch to block a bypass route from the input terminal to the output terminal so that a short current is limited and an output capacity connected to the output terminal is charged to be restored after a factor causing the short circuit of the output terminal is released, wherein the charging circuit is controlled to operate in the bypass mode or during a period when the output terminal is short-circuited in the bypass mode.

* * * * *